US012636914B2

(12) United States Patent
Singer et al.

(10) Patent No.: US 12,636,914 B2
(45) Date of Patent: May 26, 2026

(54) BI-DIRECTIONAL INTERLOCKING SIPE AND SLOT COMBINATION

(71) Applicant: BRIDGESTONE AMERICAS TIRE OPERATIONS, LLC, Nashville, TN (US)

(72) Inventors: Adam D. Singer, Massillon, OH (US); David M. Severyn, Canton, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 18/716,666

(22) PCT Filed: Nov. 28, 2022

(86) PCT No.: PCT/US2022/080480
§ 371 (c)(1),
(2) Date: Jun. 5, 2024

(87) PCT Pub. No.: WO2023/107828
PCT Pub. Date: Jun. 15, 2023

(65) Prior Publication Data
US 2025/0050689 A1 Feb. 13, 2025

Related U.S. Application Data

(60) Provisional application No. 63/286,550, filed on Dec. 6, 2021.

(51) Int. Cl.
*B60C 11/12* (2006.01)

(52) U.S. Cl.
CPC ...... *B60C 11/1218* (2013.01); *B60C 11/1281* (2013.01); *B60C 2011/1209* (2013.01); *B60C 2011/1213* (2013.01)

(58) Field of Classification Search
CPC . B60C 11/12; B60C 11/1204; B60C 11/1218; B60C 11/1272; B60C 11/1281;
(Continued)

(56) References Cited

U.S. PATENT DOCUMENTS 5,783,002 A * 7/1998 Lagnier ............... B60C 11/1218
152/209.1
2003/0201048 A1 10/2003 Radulescu et al.
(Continued)

FOREIGN PATENT DOCUMENTS

JP 5101533 B2 12/2012
JP 2020001546 A * 1/2020
(Continued)

OTHER PUBLICATIONS

Kitani N, JP-2020001546-A, machine translation. (Year: 2020).*
(Continued)

*Primary Examiner* — Sedef E Paquette

(57) ABSTRACT

In one aspect, a tire is provided, the tire comprising: a tread portion comprising at least one of a tread rib or a tread block, a sipe included in the tread rib or the tread block, the sipe including: a radially outer portion, an interlocking portion radially inward of and directly connected to the radially outer portion, and a base portion radially inward of and directly connected to the interlocking portion, wherein the interlocking portion includes a plurality of positive interlocking portions and negative interlocking portions forming a sinusoidal wave profile in a plane formed by a circumferential axis C of the tire and an axial axis A of the tire.

18 Claims, 18 Drawing Sheets

(58) Field of Classification Search
CPC .... B60C 2011/1209; B60C 2011/1213; B29D
2030/0613
USPC ........................... 152/209.18, 209.21, 209.24
See application file for complete search history.

(56) References Cited

U.S. PATENT DOCUMENTS

| | | | |
|---|---|---|---|
| 2007/0272337 A1 | 11/2007 | Bovaird et al. | |
| 2014/0000774 A1 | 1/2014 | Trombin et al. | |
| 2015/0053320 A1 | 2/2015 | Mathonet et al. | |
| 2017/0182851 A1 | 6/2017 | Lee et al. | |
| 2018/0072104 A1 | 3/2018 | Jin et al. | |
| 2018/0281328 A1 | 10/2018 | Collett et al. | |
| 2019/0315161 A1* | 10/2019 | Balini ................. | B60C 11/1218 |
| 2019/0381837 A1 | 12/2019 | Dixon et al. | |
| 2024/0025212 A1* | 1/2024 | Sankar ................. | B60C 11/124 |

FOREIGN PATENT DOCUMENTS

| | | | |
|---|---|---|---|
| JP | 2021030992 A | 3/2021 | |
| KR | 101289574 B1 | 7/2013 | |

OTHER PUBLICATIONS

International Search Report and Written Opinion issued in PCT/
US22/80480, dated Apr. 4, 2023 (9 pages).
International Preliminary Report on Patentability issued in PCT/
US22/80480, dated Jun. 5, 2024 (6 pages).
Extended European search report issued in EP22905241.0 on Oct.
16, 2025.

* cited by examiner

FIG. 2F                    FIG. 2G

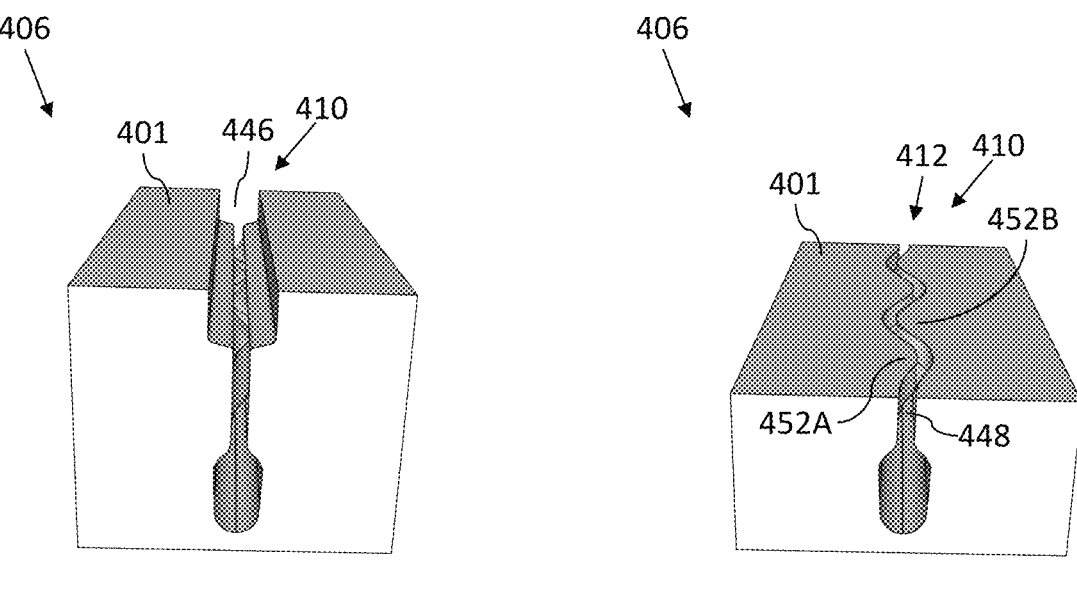
FIG. 4F
FIG. 4G
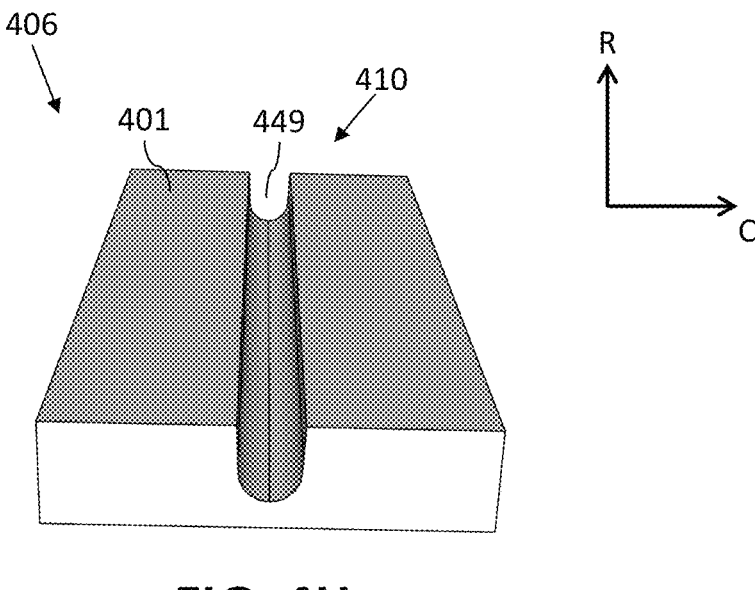
FIG. 4H

BI-DIRECTIONAL INTERLOCKING SIPE AND SLOT COMBINATION

CROSS-REFERENCE TO RELATED APPLICATIONS

This application claims priority from U.S. Provisional Patent Application No. 63/286,550, filed on Dec. 6, 2021, which is incorporated by reference herein in its entirety.

BACKGROUND

Tires are often designed to optimize performance in a variety of road conditions. For example, a tire may include tread features that are designed to optimize performance in snow-covered/icy road conditions and dry road conditions.

Obtaining traction in snow and ice may be achieved by providing "biting edges" in the tread of the tire. These "biting edges" are often in the form of sipes or slots. However, too many sipes or slots can lead to a loss of tread block or rib stiffness, which may be undesirable in the performance optimization of the tire, particularly in dry roadway conditions.

Accordingly, what is needed is a tire tread feature to balance snow and ice traction with dry roadway traction.

SUMMARY

In one aspect, a tire is provided, the tire comprising: a tread portion comprising at least one of a tread rib or a tread block, a sipe included in the tread rib or the tread block, the sipe including: a radially outer portion, an interlocking portion radially inward of and directly connected to the radially outer portion, and a base portion radially inward of and directly connected to the interlocking portion, wherein the interlocking portion includes a plurality of positive interlocking portions and negative interlocking portions forming a sinusoidal wave profile in a plane formed by a circumferential axis C of the tire and an axial axis A of the tire.

In another aspect, a tire is provided, the tire comprising: a tread portion comprising at least one of a tread rib or a tread block, a sipe included in the tread rib or the tread block, the sipe including: a radially outer portion, an interlocking portion radially inward of and directly connected to the radially outer portion, and a base portion radially inward of and directly connected to the interlocking portion, wherein the interlocking portion includes a plurality of positive interlocking portions and negative interlocking portions forming a zig-zag shape in a plane formed by a circumferential axis C of the tire and a radial axis R of the tire.

BRIEF DESCRIPTION OF THE DRAWINGS

The accompanying figures, which are incorporated in and constitute a part of the specification, illustrate various example aspects, and are used merely to illustrate various example aspects. In the figures, like elements bear like reference numerals.

FIG. 2F illustrates a perspective view of an unworn tread block 206 with a bi-directional interlocking sipe and slot 210.

FIG. 2G illustrates a perspective view of a worn tread block 206 with a bi-directional interlocking sipe and slot 210.

FIG. 4F illustrates a perspective view of an unworn tread block 406 with a bi-directional interlocking sipe and slot 410.

FIG. 4G illustrates a perspective view of a worn tread block 406 with a bi-directional interlocking sipe and slot 410.

FIG. 4H illustrates a perspective view of a worn tread block 406 with a bi-directional interlocking sipe and slot 410.

FIG. 6E illustrates a perspective view of an unworn tread block 606 with a bi-directional interlocking sipe and slot 610.

FIG. 6F illustrates a perspective view of a worn tread block 606 with a bi-directional interlocking sipe and slot 610.

DETAILED DESCRIPTION

Axes and planes described herein are illustrated in the figures and include a circumferential axis C oriented in the circumferential direction of the tire, a radial axis R oriented in the radial direction of the tire, and an axial axis A oriented in the axial direction of the tire.

Figure 1A:
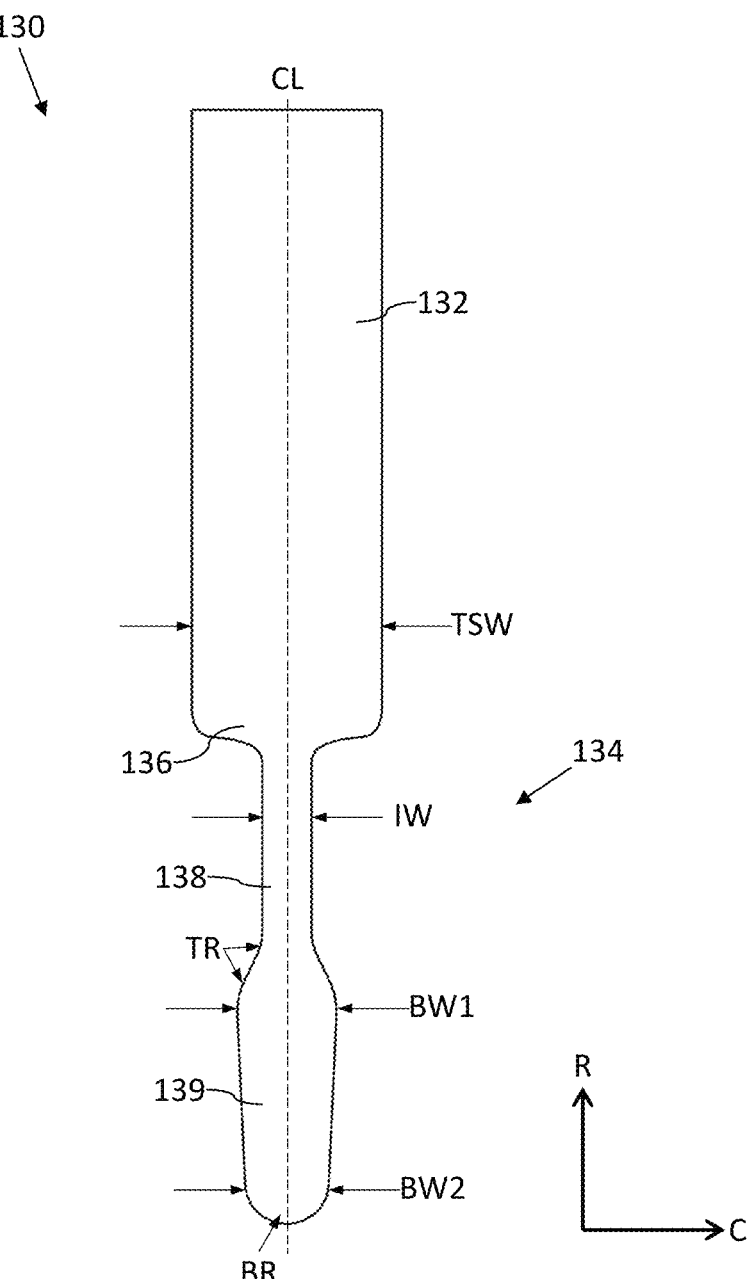
FIG. 1A illustrates an elevation sectional view of a sipe blade 130 for forming a bi-directional interlocking sipe and slot.
Figure 1B:
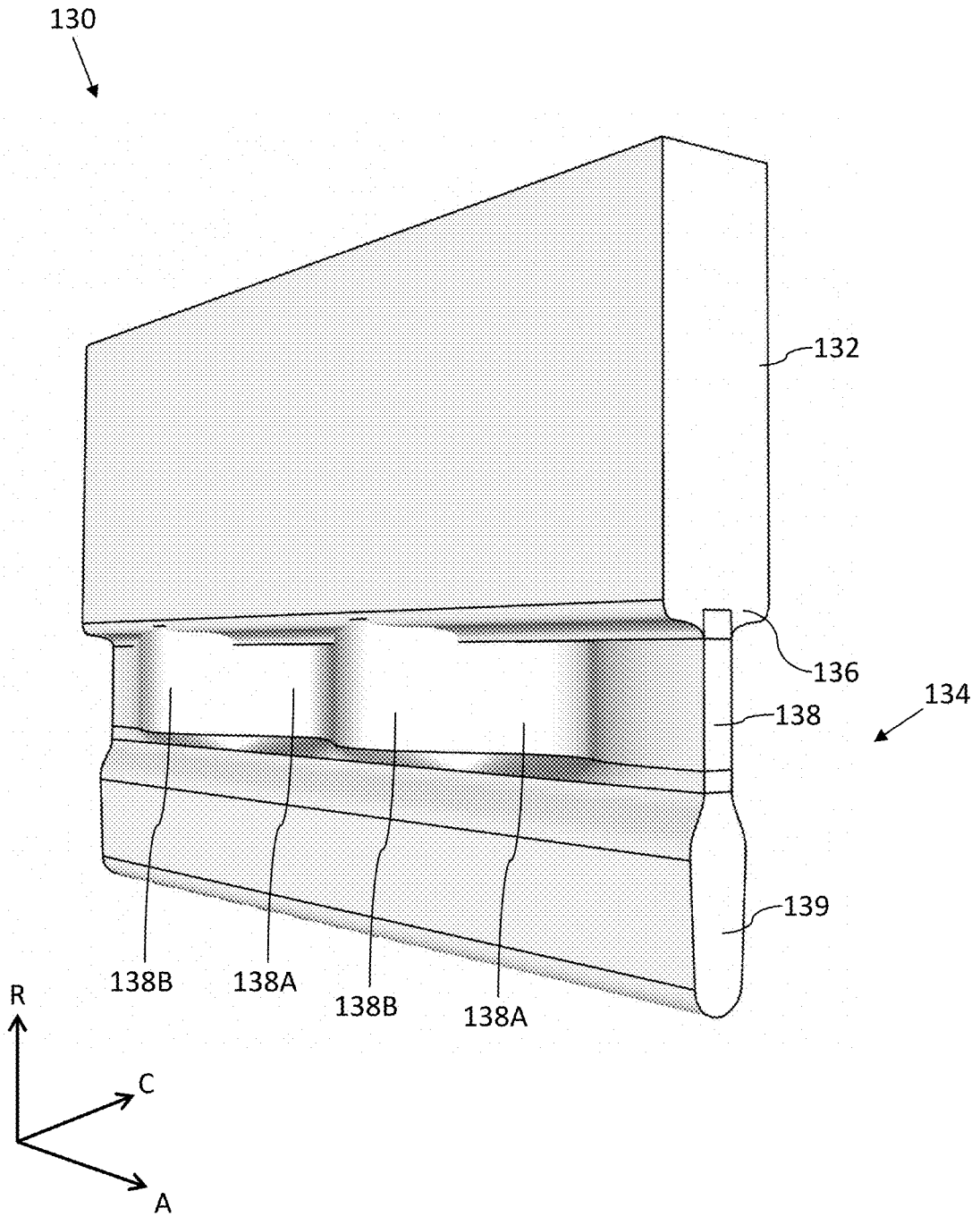
FIG. 1B illustrates a perspective view of sipe blade 130 for forming a bi-directional interlocking sipe and slot.

FIGS. 1A and 1B illustrate a sipe blade 130 for forming a bi-directional interlocking sipe and slot. Sipe blade 130 includes an upper mold insertion portion 132 and a lower sipe forming portion 134.

Sipe blade 130 terminates radially inwardly in a terminal base portion 139. Sipe blade 130 includes a centerline CL that extends through the center of upper mold insertion portion 132 and the center of base portion 139.

Lower portion 134 includes a plurality of portions for forming a sipe. A radially outer widened portion 136 is radially inward of and directly connected to upper portion 132. Outer portion 136 tapers radially inwardly into an interlocking portion 138. Interlocking portion 138 is radially inward of and directly connected to outer portion 136. Finally, base portion 139 is radially inward of and directly connected to interlocking portion 138. Base portion 139 tapers radially outwardly into interlocking portion 138.

Upper portion 132 includes a circumferential tread surface sipe width TSW, which is the width of the sipe (e.g., sipe/slot 210 described below) at the tread surface (e.g., tread surface 201). Width TSW may be about 2.00 mm. Width TSW may be 2.00 mm. Width TSW may be between about 1.80 mm and about 2.20 mm. Width TSW may be between 1.80 mm and 2.20 mm. Width TSW may be between about 1.60 mm and about 2.40 mm. Width TSW may be between 1.60 mm and 2.40 mm. Width TSW may be between about 1.40 mm and about 2.60 mm. Width TSW may be between 1.40 mm and 2.60 mm.

Interlocking portion 138 includes a circumferential width IW. Width IW may be about 0.50 mm. Width IW may be 0.50 mm. Width IW may be between about 0.40 mm and about 0.60 mm. Width IW may be between 0.40 mm and 0.60 mm. Width IW may be between about 0.30 mm and about 0.70 mm. Width IW may be between 0.30 mm and 0.70 mm. Width IW may be between about 0.20 mm and about 0.80 mm. Width IW may be between 0.20 mm and 0.80 mm.

Base portion 139 tapers radially outwardly into interlocking portion 138 with taper radii TR. Taper radii TR may be about 0.50 mm. Taper radii TR may be 0.50 mm. Taper radii TR be between about 0.40 mm and about 0.60 mm. Taper radii TR may be between 0.40 mm and 0.60 mm. Taper radii TR may be between about 0.30 mm and about 0.70 mm. Taper radii TR may be between 0.30 mm and 0.70 mm. Taper radii TR may be between about 0.20 mm and about 0.80 mm. Taper radii TR may be between 0.20 mm and 0.80 mm.

Base portion 139 tapers radially inwardly from a width BW1 to a width BW2.

Width BW1 may be about 1.00 mm. Width BW1 may be 1.00 mm. Width BW1 may be between about 0.90 mm and about 1.10 mm. Width BW1 may be between 0.90 mm and 1.10 mm. Width BW1 may be between about 0.80 mm and about 1.20 mm. Width BW1 may be between 0.80 mm and 1.20 mm. Width BW1 may be between about 0.70 mm and about 1.30 mm. Width BW1 may be between 0.70 mm and 1.30 mm.

Width BW2 may be about 0.80 mm. Width BW2 may be 0.80 mm. Width BW2 may be between about 0.70 mm and about 0.90 mm. Width BW2 may be between 0.70 mm and 0.90 mm. Width BW2 may be between about 0.60 mm and about 1.00 mm. Width BW2 may be between 0.60 mm and 1.00 mm. Width BW2 may be between about 0.50 mm and about 1.10 mm. Width BW2 may be between 0.50 mm and 1.10 mm.

The ratio of width BW1 to width BW2 may be about or exactly 1.25. The ratio of width BW1 to width BW2 may be between about or exactly 1.11 and 1.57.

The ratio of width TSW to width BW1 may be about or exactly 2.00.

The ratio of width TSW to width BW2 may be about or exactly 2.50.

The ratio of width TSW to width IW may be about or exactly 4.00.

The ratio of width BW1 to width IW may be about or exactly 2.00.

Width TSW may be greater than width IW, width BW1, and width BW2.

Base portion 139 includes a radially inwardmost radius BR. Radius BR may be about 1.00 mm. Radius BR may be 1.00 mm. Radius BR be between about 0.90 mm and about 1.10 mm. Radius BR may be between 0.90 mm and 1.10 mm. Radius BR may be between about 0.80 mm and about 1.20 mm. Radius BR may be between 0.80 mm and 1.20 mm. Radius BR may be between about 0.70 mm and about 1.30 mm. Radius BR may be between 0.70 mm and 1.30 mm.

As illustrated in FIG. 1B, interlocking portion 138 may include a plurality of negative interlocking portions 138A and positive interlocking portions 138B. Interlocking portion 138 may include a wave shape that approximates a sinusoidal wave in a plane formed by the circumferential axis C and the axial axis A. The sinusoidal wave is made up of negative interlocking portions 138A and positive interlocking portions 138B.

FIGS. 2A-2H illustrate a tread block or tread rib 206 (tread block and tread rib are used herein interchangeably to assist in readability of the application) with a bi-directional interlocking sipe and slot 210. The sipe/slot 210 is formed using sipe blade 130 and thus includes the same dimensions and ratios described with respect to sipe blade 130. Sipe/slot 210 extends radially inwardly into tread block 206 from a tread surface 201. Sipe/slot 210 may include a radially widened portion 246, an interlocking portion 248, and a base portion 249. Interlocking portion 248 may be radially inward of and directly connected to outer portion 246. Base portion 249 may be radially inward of and directly connected to interlocking portion 248.

Interlocking portion 248 includes a plurality of positive interlocking portions 252A and a plurality of negative interlocking portions 252B. Positive interlocking portions 252A and negative interlocking portions 252B are out of phase with one another such that each interlocking portion fits into a void between two opposing interlocking portions.

Base portion 249 is tapered as described above with respect to base portion 139 of sipe blade 130.

Figure 2A:
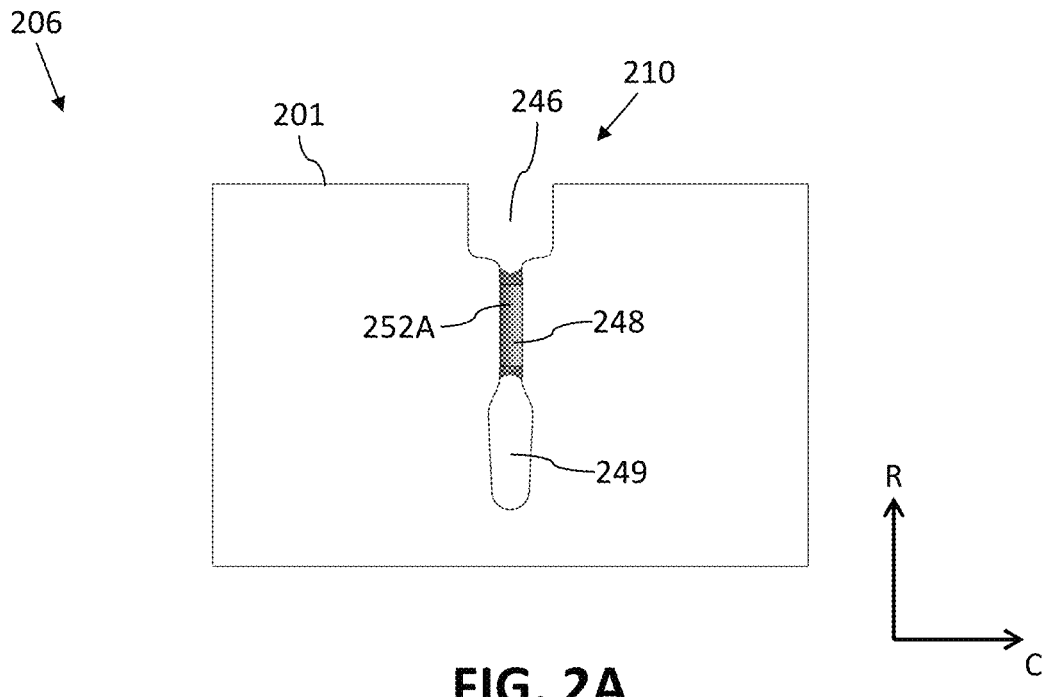
FIG. 2A illustrates an elevation view of a tread block 206 with a bi-directional interlocking sipe and slot 210.
Figure 2B:
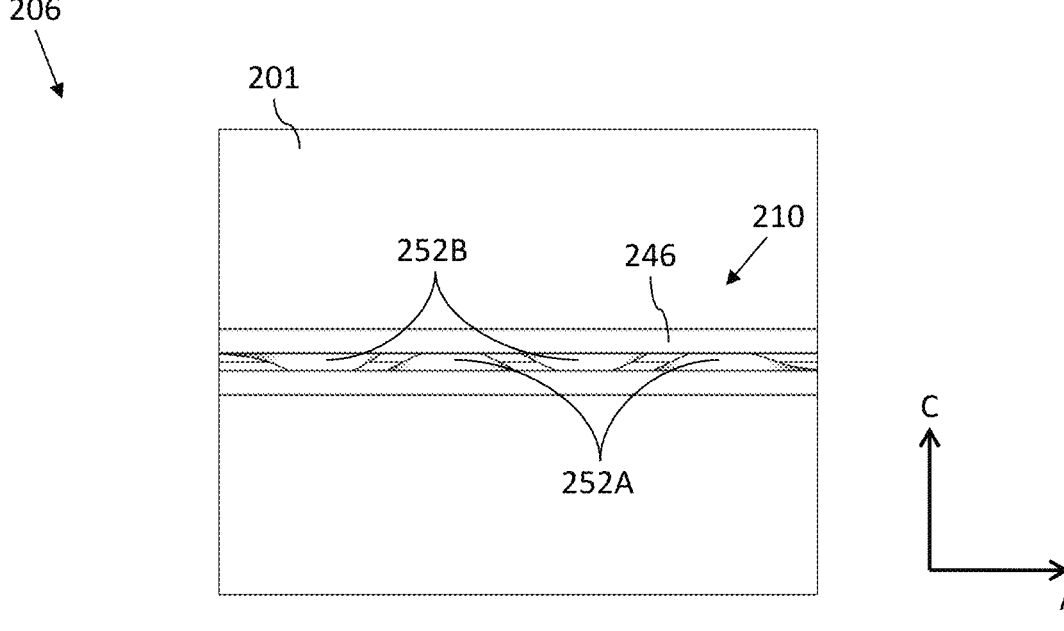
FIG. 2B illustrates a plan view of tread block 206 with bi-directional interlocking sipe and slot 210.
Figure 2C:
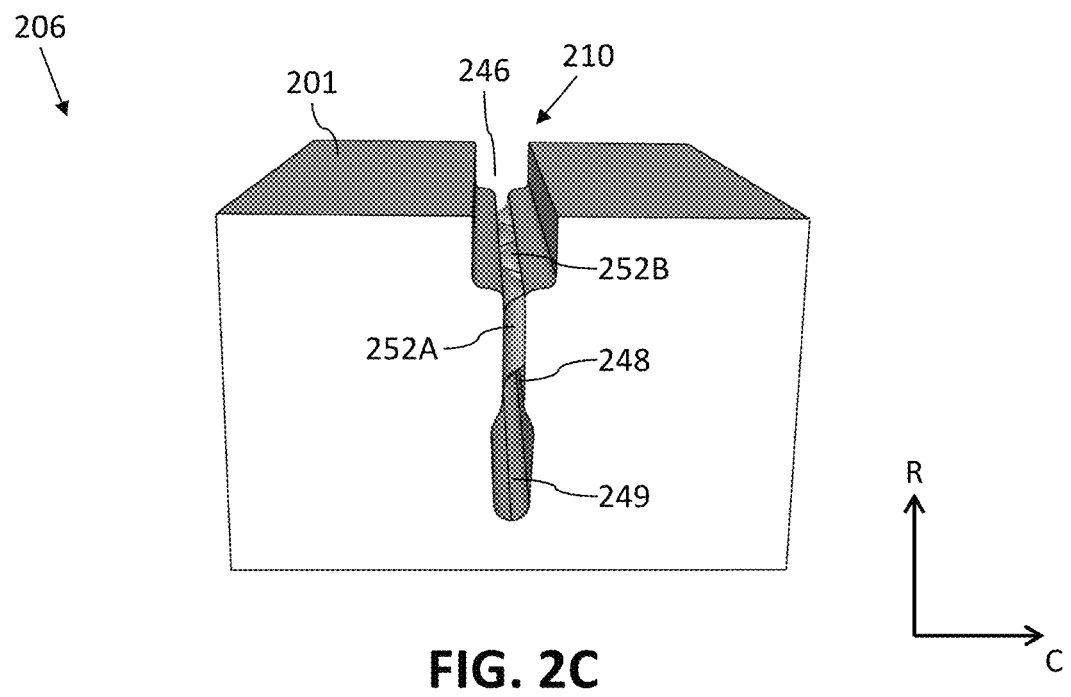
FIG. 2C illustrates a perspective view of tread block 206 with a bi-directional interlocking sipe and slot 210.
Figure 2D:
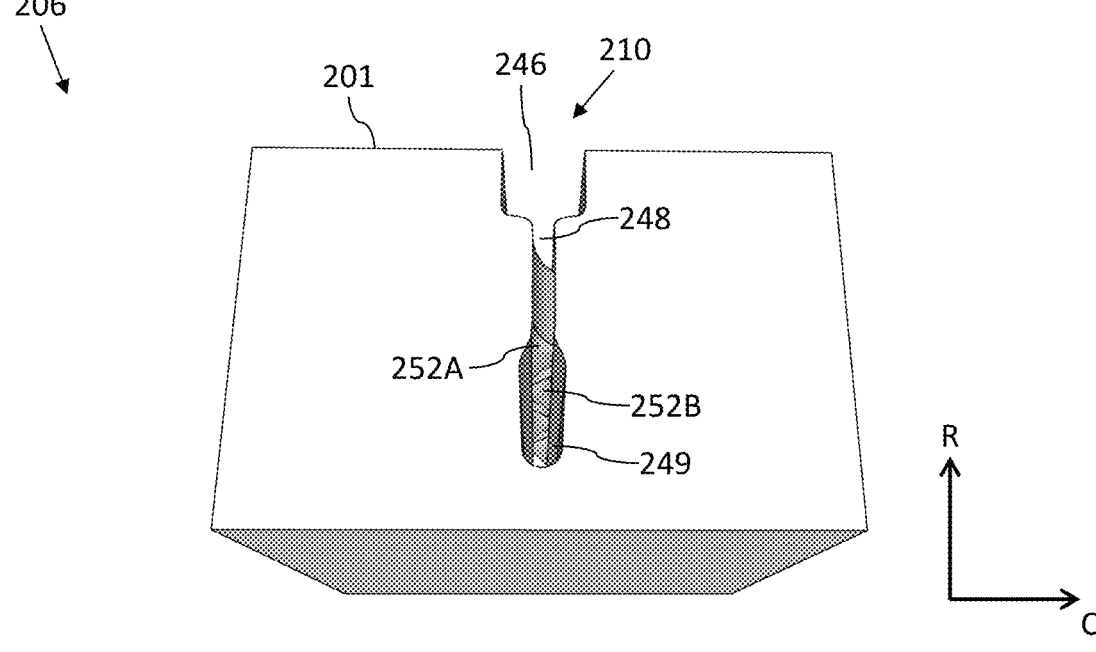
FIG. 2D illustrates a perspective view of tread block 206 with a bi-directional interlocking sipe and slot 210.
Figure 2E:
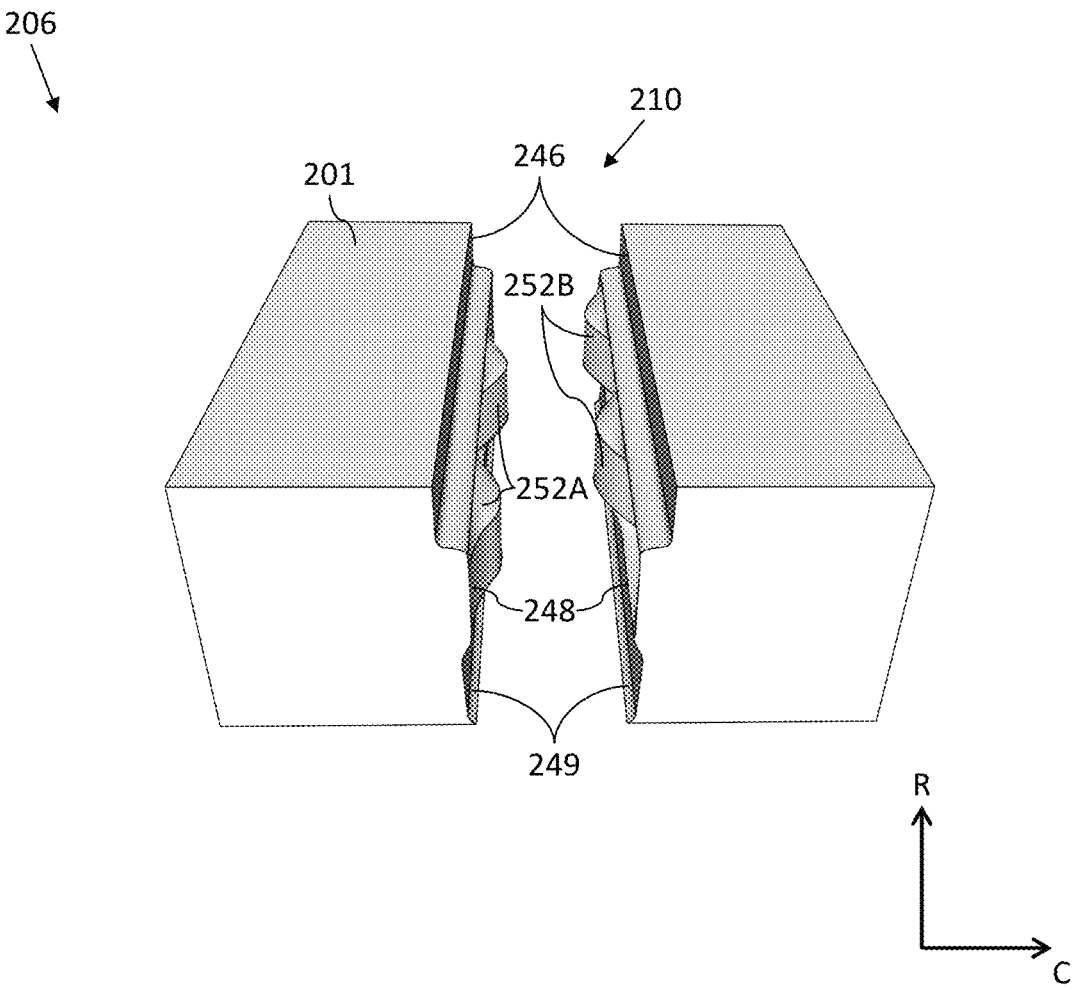
FIG. 2E illustrates an exploded perspective view of tread block 206 with a bi-directional interlocking sipe and slot 210.
Figure 2H:
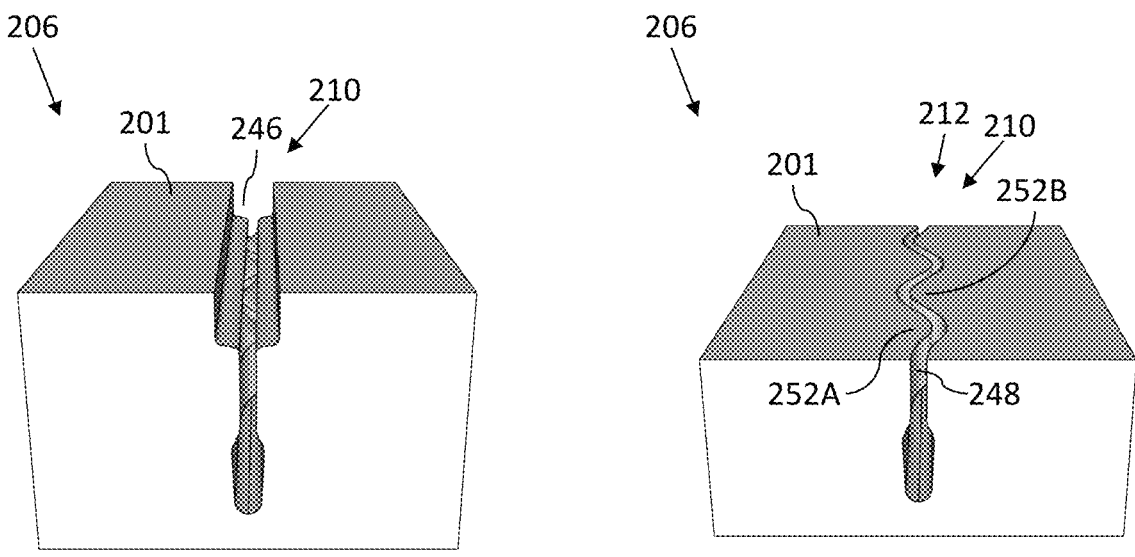
FIG. 2H illustrates a perspective view of a worn tread block 206 with a bi-directional interlocking sipe and slot 210.
Figure 2H:
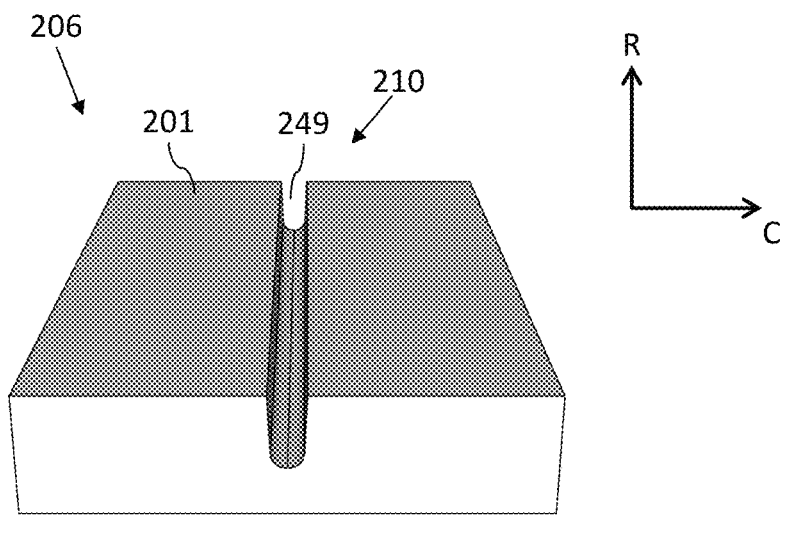

FIGS. 2F-2H show block 206 in various states of wear. FIG. 2F illustrates block 206 in an unworn condition. FIG. 2G illustrates block 206 in a worn condition, wherein outer portion 246 has been worn away such that interlocking portion 248 contacts tread surface 201. The sinusoidal wave profile of interlocking portion 248 is easily visible in FIG. 2G. FIG. 2H illustrates block 206 in a worn condition, wherein outer portion 246 and interlocking portion 248 have been worn away such that base portion 249 contacts tread surface 201.

As is illustrated in the various wear stages of FIGS. 2F-2H, sipe/slot 210 may act as a slot (wider than a sipe) at outer portion 246 and base portion 249, and an interlocking sipe (thinner than a slot) at interlocking portion 248.

Figure 3A:
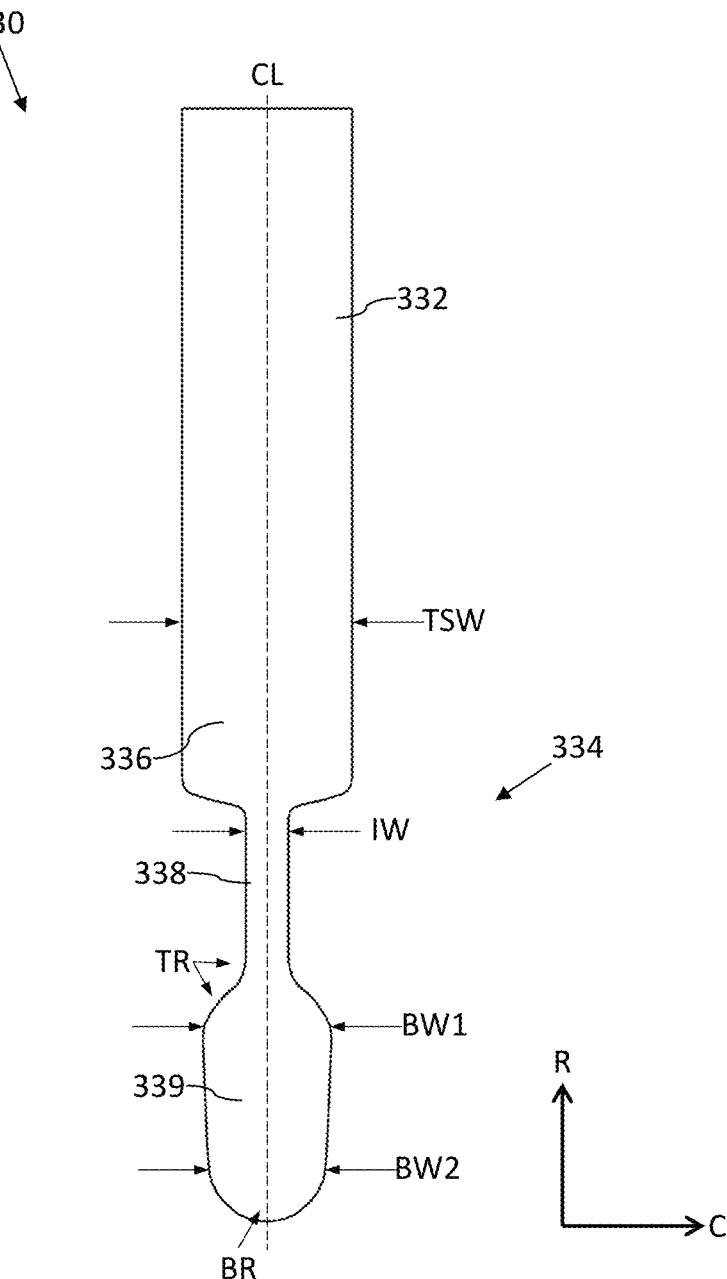
FIG. 3A illustrates an elevation sectional view of a sipe blade 330 for forming a bi-directional interlocking sipe and slot.
Figure 3B:
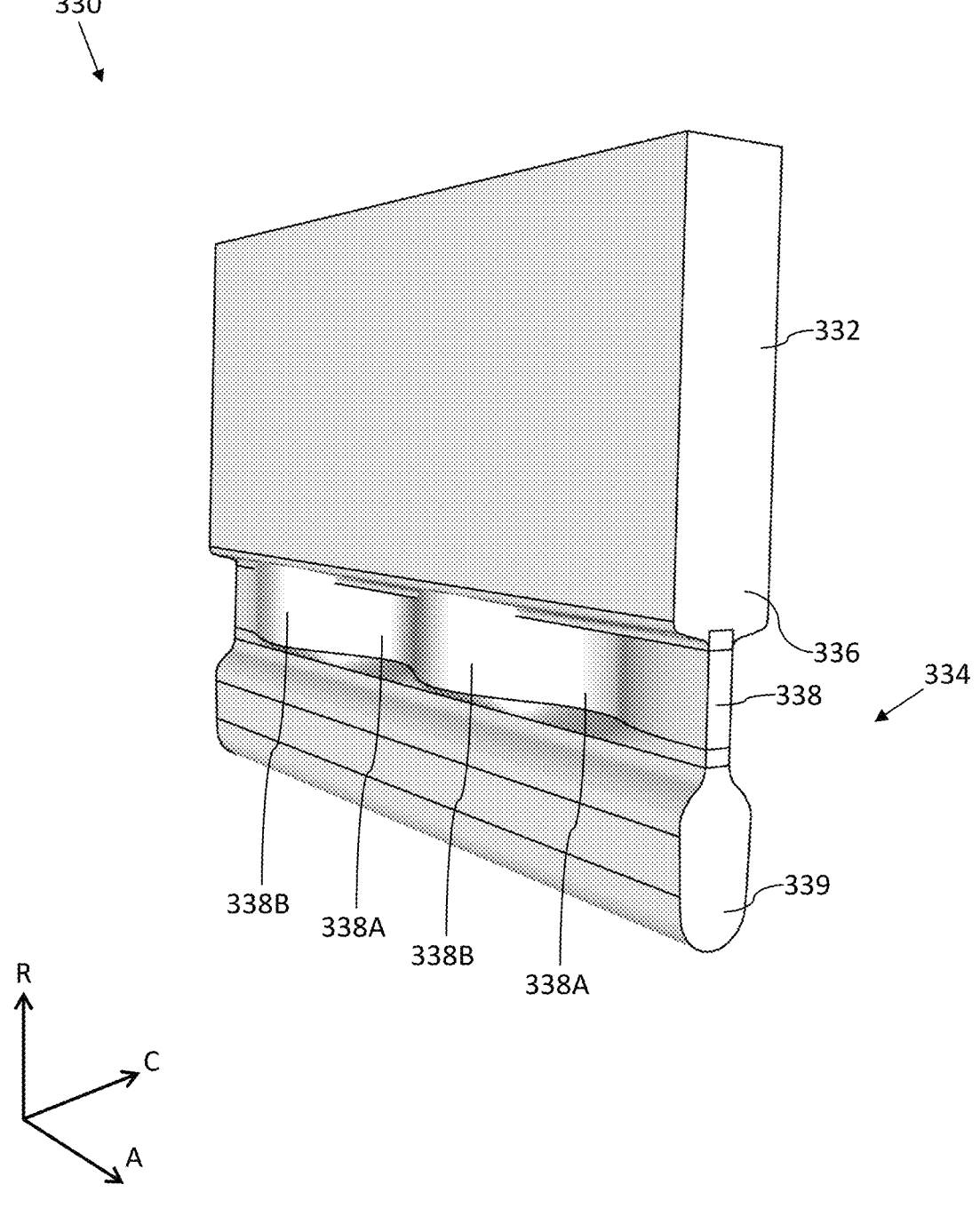
FIG. 3B illustrates a perspective view of sipe blade 330 for forming a bi-directional interlocking sipe and slot.
Figure 4A:
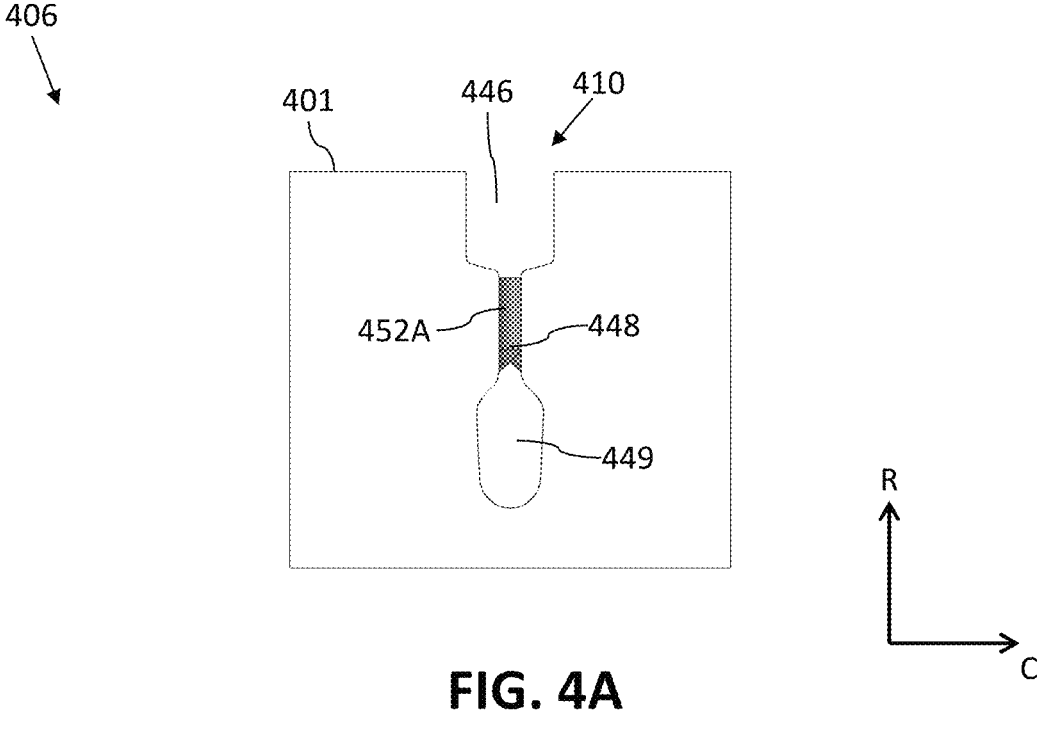
FIG. 4A illustrates an elevation view of a tread block 406 with a bi-directional interlocking sipe and slot 410.
Figure 4B:
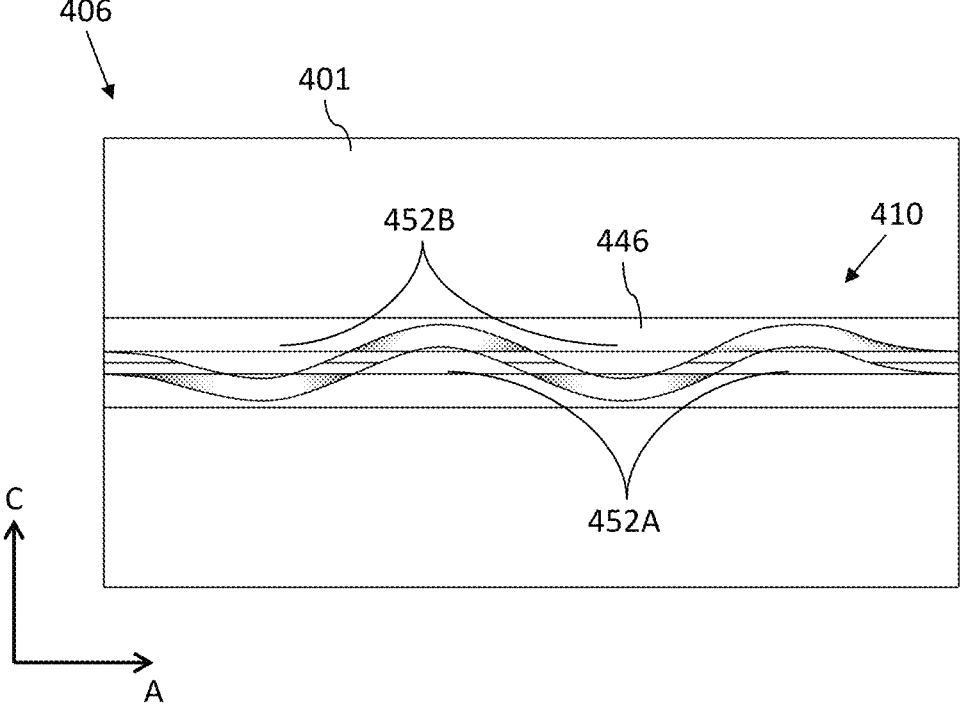
FIG. 4B illustrates a plan view of tread block 406 with bi-directional interlocking sipe and slot 410.
Figure 4C:
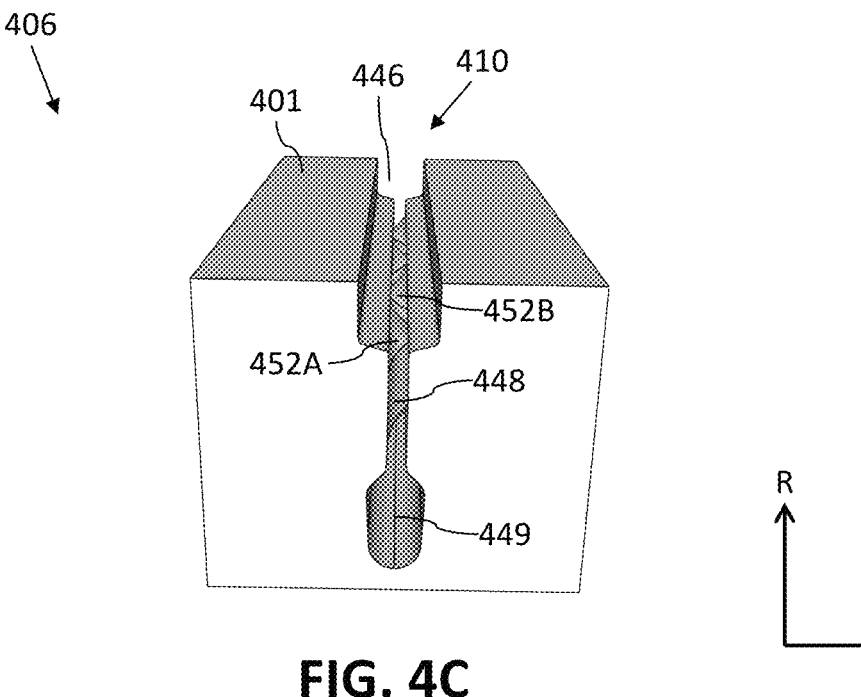
FIG. 4C illustrates a perspective view of tread block 406 with a bi-directional interlocking sipe and slot 410.
Figure 4D:
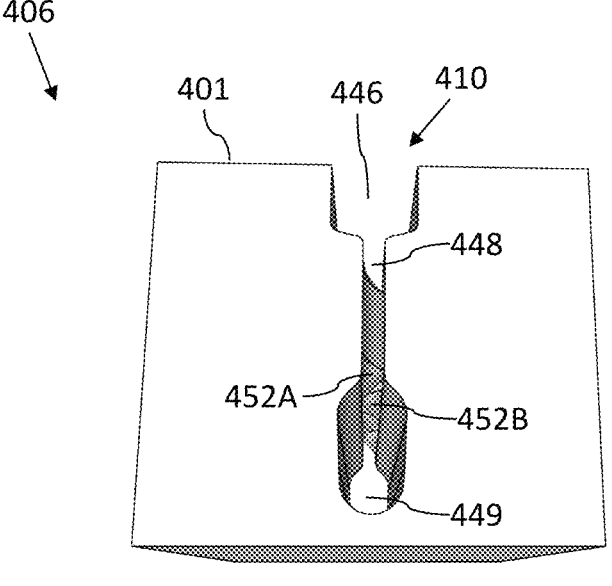
FIG. 4D illustrates a perspective view of tread block 406 with a bi-directional interlocking sipe and slot 410.
Figure 4D:
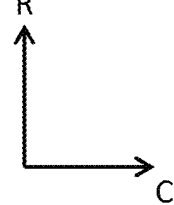
Figure 4E:
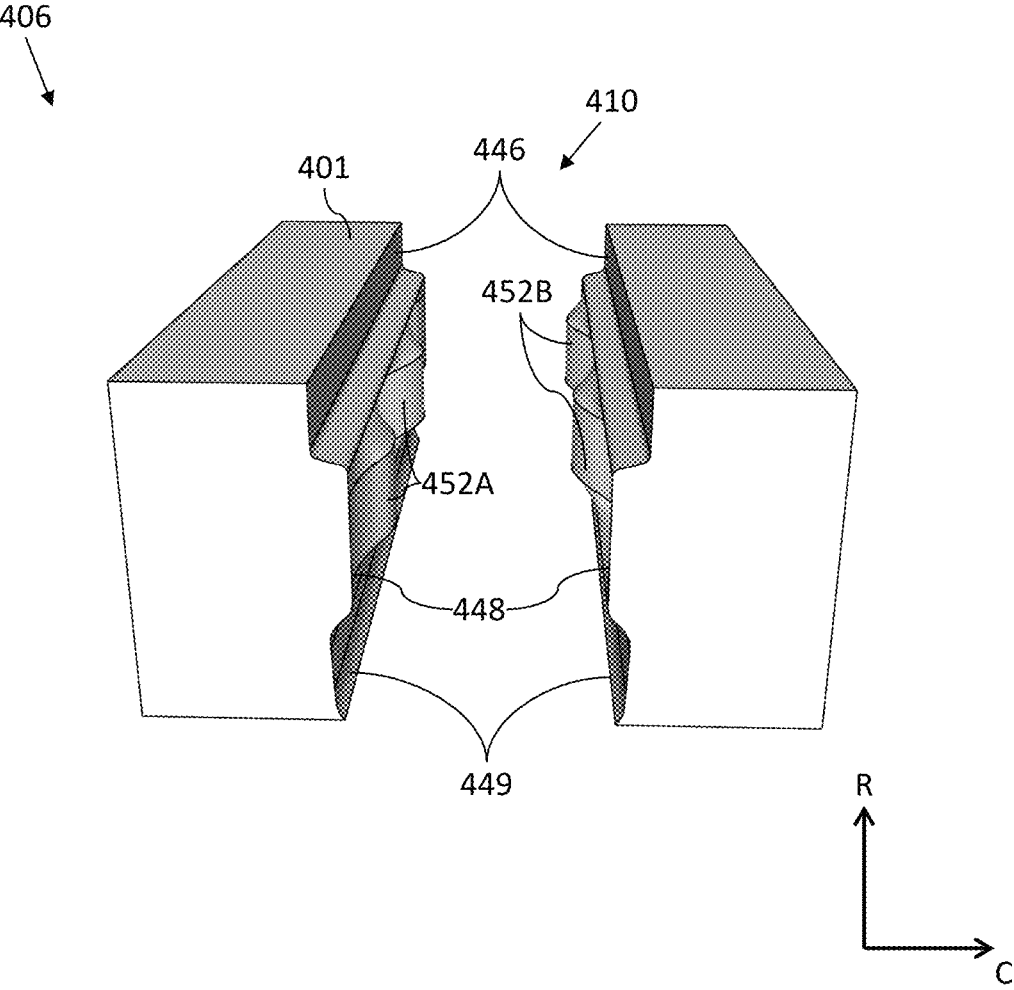
FIG. 4E illustrates an exploded perspective view of tread block 406 with a bi-directional interlocking sipe and slot 410.

FIGS. 3A and 3B illustrate a sipe blade 330 for forming a bi-directional interlocking sipe and slot. Sipe blade 330 includes an upper mold insertion portion 332 and a lower sipe forming portion 334.

Sipe blade 330 terminates radially inwardly in a terminal base portion 339. Sipe blade 330 includes a centerline CL that extends through the center of upper mold insertion portion 332 and the center of base portion 339.

Lower portion 334 includes a plurality of portions for forming a sipe. A radially outer widened portion 336 is radially inward of and directly connected to upper portion 332. Outer portion 336 tapers radially inwardly into an interlocking portion 338. Interlocking portion 338 is radially inward of and directly connected to outer portion 336. Finally, base portion 339 is radially inward of and directly connected to interlocking portion 338. Base portion 339 tapers radially outwardly into interlocking portion 338.

Upper portion 332 includes a circumferential tread surface sipe width TSW, which is the width of the sipe (e.g., sipe/slot 410 described below) at the tread surface (e.g., tread surface 401). Width TSW may be about 2.00 mm. Width TSW may be 2.00 mm. Width TSW may be between about 1.80 mm and about 2.20 mm. Width TSW may be between 1.80 mm and 2.20 mm. Width TSW may be between about 1.60 mm and about 2.40 mm. Width TSW may be between 1.60 mm and 2.40 mm. Width TSW may be between about 1.40 mm and about 2.60 mm. Width TSW may be between 1.40 mm and 2.60 mm.

Interlocking portion 338 includes a circumferential width IW. Width IW may be about 0.50 mm. Width IW may be 0.50 mm. Width IW may be between about 0.40 mm and about 0.60 mm. Width IW may be between 0.40 mm and 0.60 mm. Width IW may be between about 0.30 mm and about 0.70 mm. Width IW may be between about 0.30 mm and 0.70 mm. Width IW may be between about 0.20 mm and about 0.80 mm. Width IW may be between 0.20 mm and 0.80 mm.

Base portion 339 tapers radially outwardly into interlocking portion 338 with taper radii TR. Taper radii TR may be about 0.50 mm. Taper radii TR may be 0.50 mm. Taper radii TR be between about 0.40 mm and about 0.60 mm. Taper radii TR may be between 0.40 mm and 0.60 mm. Taper radii TR may be between about 0.30 mm and about 0.70 mm. Taper radii TR may be between 0.30 mm and 0.70 mm. Taper radii TR may be between about 0.20 mm and about 0.80 mm. Taper radii TR may be between 0.20 mm and 0.80 mm.

Base portion 339 tapers radially inwardly from a width BW1 to a width BW2.

Width BW1 may be about 1.50 mm. Width BW1 may be 1.50 mm. Width BW1 may be between about 1.40 mm and about 1.60 mm. Width BW1 may be between 1.40 mm and 1.60 mm. Width BW1 may be between about 1.30 mm and about 1.70 mm. Width BW1 may be between 1.30 mm and 1.70 mm. Width BW1 may be between about 1.20 mm and about 1.80 mm. Width BW1 may be between 1.20 mm and 1.80 mm.

Width BW2 may be about 1.30 mm. Width BW2 may be 1.30 mm. Width BW2 may be between about 1.20 mm and about 1.40 mm. Width BW2 may be between 1.20 mm and 1.40 mm. Width BW2 may be between about 1.10 mm and about 1.50 mm. Width BW2 may be between 1.10 mm and 1.50 mm. Width BW2 may be between about 1.00 mm and about 1.60 mm. Width BW2 may be between 1.00 mm and 1.60 mm.

The ratio of width BW1 to width BW2 may be about or exactly 1.15. The ratio of width BW1 to width BW2 may be between about or exactly 1.07 and 1.33.

The ratio of width TSW to width BW1 may be about or exactly 1.33.

The ratio of width TSW to width BW2 may be about or exactly 1.54.

The ratio of width TSW to width IW may be about or exactly 4.00.

The ratio of width BW1 to width IW may be about or exactly 3.00.

Width TSW may be greater than width IW, width BW1, and width BW2.

Base portion 339 includes a radially inwardmost radius BR. Radius BR may be about 1.00 mm. Radius BR may be 1.00 mm. Radius BR be between about 0.90 mm and about 1.10 mm. Radius BR may be between 0.90 mm and 1.10 mm. Radius BR may be between about 0.80 mm and about 1.20 mm. Radius BR may be between 0.80 mm and 1.20 mm. Radius BR may be between about 0.70 mm and about 1.30 mm. Radius BR may be between 0.70 mm and 1.30 mm.

As illustrated in FIG. 3B, interlocking portion 338 may include a plurality of negative interlocking portions 338A and positive interlocking portions 338B. Interlocking portion 338 may include a wave shape that approximates a sinusoidal wave in a plane formed by the circumferential axis C and the axial axis A. The sinusoidal wave is made up of negative interlocking portions 338A and positive interlocking portions 338B.

FIGS. 4A-4H illustrate a tread block or tread rib 406 (tread block and tread rib are used herein interchangeably to assist in readability of the application) with a bi-directional interlocking sipe and slot 410. The sipe/slot 410 is formed using sipe blade 330 and thus includes the same dimensions and ratios described with respect to sipe blade 330. Sipe/slot 410 extends radially inwardly into tread block 406 from a tread surface 401. Sipe/slot 410 may include a radially outer widened portion 446, an interlocking portion 448, and a base portion 449. Interlocking portion 448 may be radially inward of and directly connected to outer portion 446. Base portion 449 may be radially inward of and directly connected to interlocking portion 448.

Interlocking portion 448 includes a plurality of positive interlocking portions 452A and a plurality of negative interlocking portions 452B. Positive interlocking portions 452A and negative interlocking portions 452B are out of phase with one another such that each interlocking portion fits into a void between two opposing interlocking portions.

Base portion 449 is tapered as described above with respect to base portion 439 of sipe blade 430.

FIGS. 4F-4H show block 406 in various states of wear. FIG. 4F illustrates block 406 in an unworn condition. FIG. 4G illustrates block 406 in a worn condition, wherein outer portion 446 has been worn away such that interlocking portion 448 contacts tread surface 401. The sinusoidal wave profile of interlocking portion 448 is easily visible in FIG. 4G. FIG. 4H illustrates block 406 in a worn condition, wherein outer portion 446 and interlocking portion 448 have been worn away such that base portion 449 contacts tread surface 401.

As is illustrated in the various wear stages of FIGS. 4F-4H, sipe/slot 410 may act as a slot (wider than a sipe) at outer portion 446 and base portion 449, and an interlocking sipe (thinner than a slot) at interlocking portion 448.

Figure 5A:
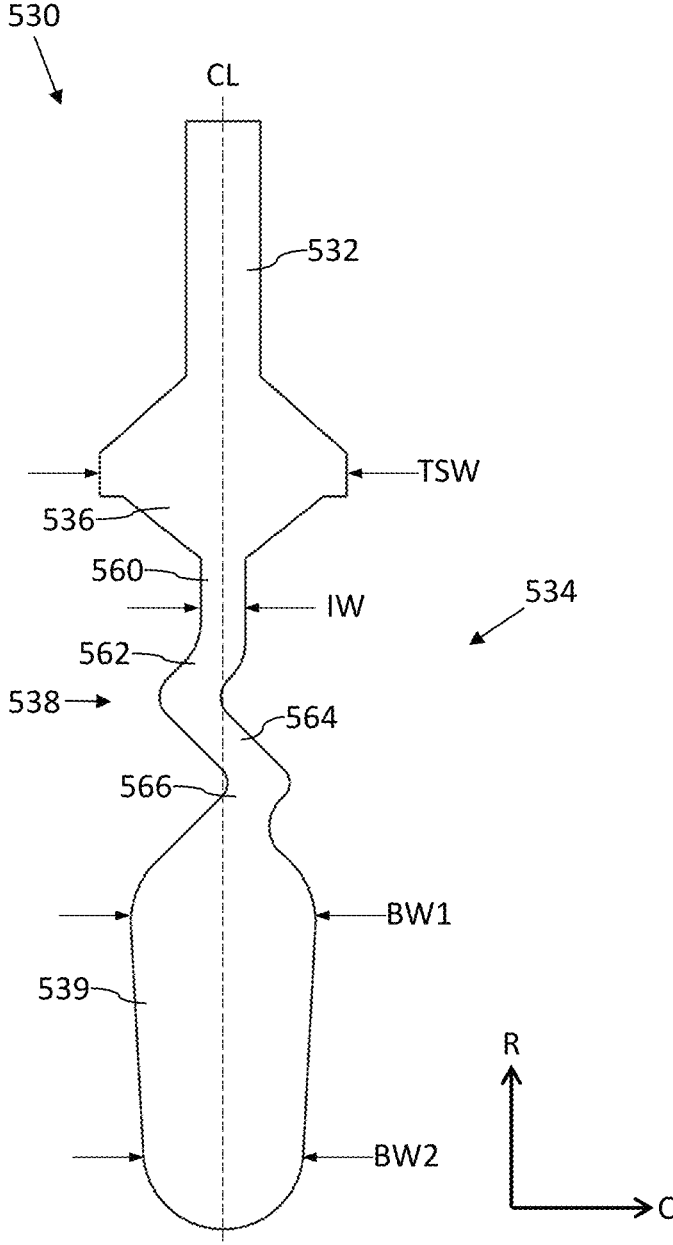
FIG. 5A illustrates an elevation sectional view of a sipe blade 530 for forming a bi-directional interlocking sipe and slot.
Figure 5B:
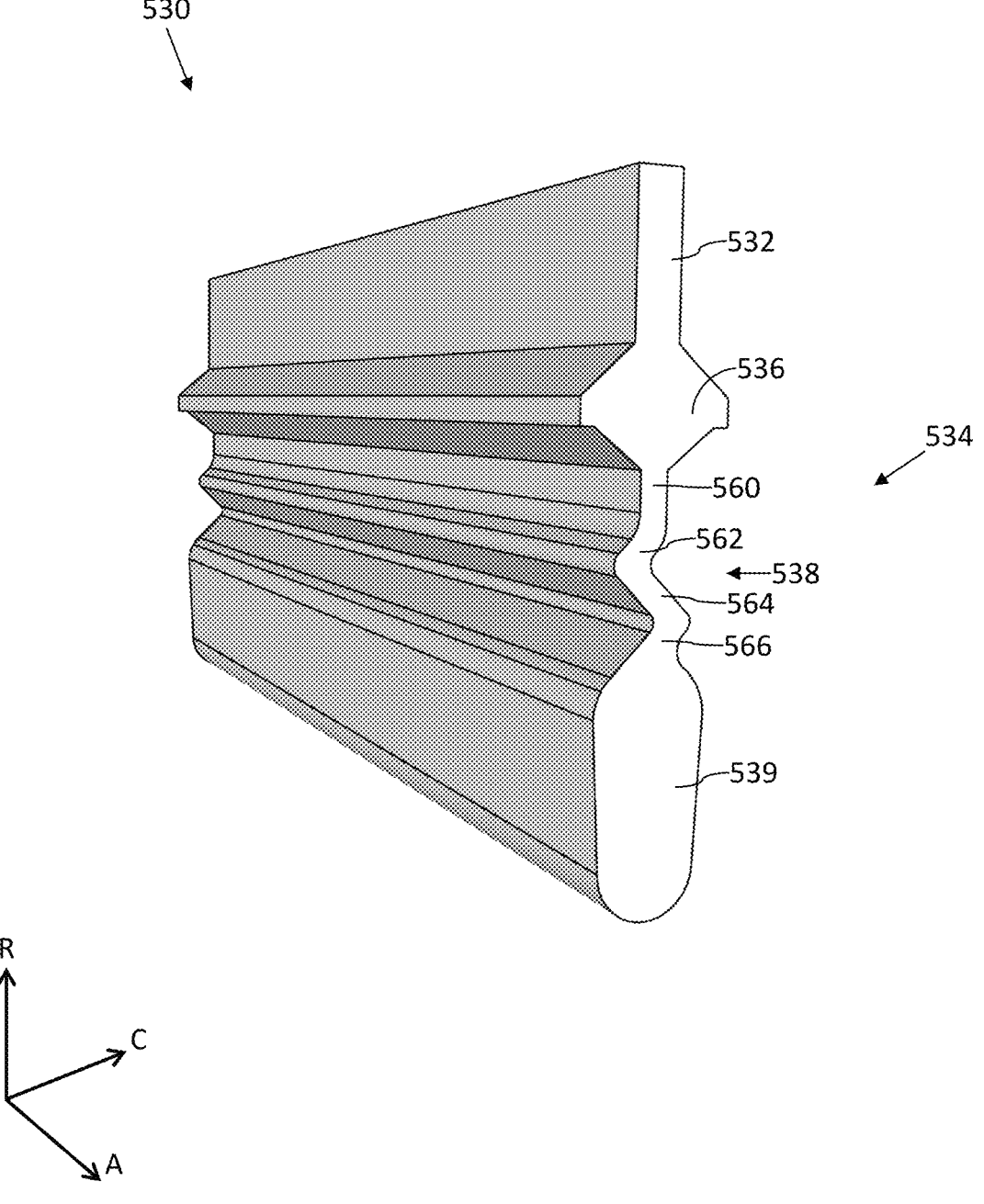
FIG. 5B illustrates a perspective view of sipe blade 530 for forming a bi-directional interlocking sipe and slot.

FIGS. 5A and 5B illustrate a sipe blade 530 for forming a bi-directional interlocking sipe and slot. Sipe blade 530 includes an upper mold insertion portion 532 and a lower sipe forming portion 534.

Sipe blade 530 terminates radially inwardly in a terminal base portion 539. Sipe blade 530 includes a centerline CL that extends through the center of upper mold insertion portion 532 and the center of base portion 539.

Lower portion 534 includes a plurality of portions for forming a sipe. A radially outer widened portion 536 is radially inward of and directly connected to upper portion 532. Outer portion 536 tapers radially inwardly into an interlocking portion 538. Interlocking portion 538 is radially inward of and directly connected to outer portion 536. Finally, base portion 539 is radially inward of and directly connected to interlocking portion 538. Base portion 539 tapers radially outwardly into interlocking portion 538.

Interlocking portion 538 may include a radially outermost radial portion 560 connected directly to outer portion 536. Interlocking portion 538 may include a first angled portion 562 angled in a first circumferential direction, oriented radially inwardly of and connected directly to radial portion 560. Interlocking portion 538 may include a second angled portion 564 angled in a second circumferential direction, oriented radially inwardly of and connected directly to first angled portion 562. Interlocking portion 538 may include a third angled portion 566 angled in the first circumferential direction, oriented radially inwardly of and connected directly to second angled portion 564. Base portion 539 is oriented radially inwardly of and connected directly to third angled portion 566. First, second, and third angled portions 562, 564, 566 of interlocking portion 538 may form a zig-zag shape in a plane formed by the radial axis R and the circumferential axis C. Alternatively, first, second, and third angled portions 562, 564, 566 of interlocking portion 538 may form a sinusoidal wave shape in a plane formed by the radial axis R and the circumferential axis C.

Upper portion 532 includes a circumferential tread surface sipe width TSW, which is the width of the sipe (e.g., sipe/slot 610 described below) at the tread surface (e.g., tread surface 601). Width TSW may be about 2.00 mm. Width TSW may be 2.00 mm. Width TSW may be between about 1.80 mm and about 2.20 mm. Width TSW may be between 1.80 mm and 2.20 mm. Width TSW may be between about 1.60 mm and about 2.40 mm. Width TSW may be between 1.60 mm and 2.40 mm. Width TSW may be between about 1.40 mm and about 2.60 mm. Width TSW may be between 1.40 mm and 2.60 mm.

Interlocking portion 538 includes a circumferential width IW. Width IW may be about 0.50 mm. Width IW may be 0.50 mm. Width IW may be between about 0.40 mm and about 0.60 mm. Width IW may be between 0.40 mm and 0.60 mm. Width IW may be between about 0.30 mm and about 0.70 mm. Width IW may be between 0.30 mm and 0.70 mm. Width IW may be between about 0.20 mm and about 0.80 mm. Width IW may be between 0.20 mm and 0.80 mm.

Base portion 539 tapers radially inwardly from a width BW1 to a width BW2.

Width BW1 may be about 1.00 mm. Width BW1 may be 1.00 mm. Width BW1 may be between about 0.90 mm and about 1.10 mm. Width BW1 may be between 0.90 mm and 1.10 mm. Width BW1 may be between about 0.80 mm and about 1.20 mm. Width BW1 may be between 0.80 mm and 1.20 mm. Width BW1 may be between about 0.70 mm and about 1.30 mm. Width BW1 may be between 0.70 mm and 1.30 mm.

Alternatively, width BW1 may be about 1.50 mm. Width BW1 may be 1.50 mm. Width BW1 may be between about 1.40 mm and about 1.60 mm. Width BW1 may be between 1.40 mm and 1.60 mm. Width BW1 may be between about 1.30 mm and about 1.70 mm. Width BW1 may be between 1.30 mm and 1.70 mm. Width BW1 may be between about 1.20 mm and about 1.80 mm. Width BW1 may be between 1.20 mm and 1.80 mm.

Width BW2 may be about 0.80 mm. Width BW2 may be 0.80 mm. Width BW2 may be between about 0.70 mm and about 0.90 mm. Width BW2 may be between 0.70 mm and 0.90 mm. Width BW2 may be between about 0.60 mm and about 1.00 mm. Width BW2 may be between 0.60 mm and 1.00 mm. Width BW2 may be between 0.50 mm and about 1.10 mm. Width BW2 may be between 0.50 mm and 1.10 mm.

Alternatively, width BW2 may be about 1.30 mm. Width BW2 may be 1.30 mm. Width BW2 may be between about 1.20 mm and about 1.40 mm. Width BW2 may be between 1.20 mm and 1.40 mm. Width BW2 may be between about 1.10 mm and about 1.50 mm. Width BW2 may be between 1.10 mm and 1.50 mm. Width BW2 may be between about 1.00 mm and about 1.60 mm. Width BW2 may be between 1.00 mm and 1.60 mm.

The ratio of width BW1 to width BW2 may be about or exactly 1.25. The ratio of width BW1 to width BW2 may be between about or exactly 1.11 and 1.57. Alternatively, the ratio of width BW1 to width BW2 may be about or exactly 1.15. The ratio of width BW1 to width BW2 may be between about or exactly 1.07 and 1.33.

The ratio of width TSW to width BW1 may be about or exactly 2.00. The ratio of width TSW to width BW1 may be about or exactly 1.33.

The ratio of width TSW to width BW2 may be about or exactly 2.50. The ratio of width TSW to width BW2 may be about or exactly 1.54.

The ratio of width TSW to width IW may be about or exactly 4.00.

The ratio of width BW1 to width IW may be about or exactly 2.00. The ratio of width BW1 to width IW may be about or exactly 3.00.

Width TSW may be greater than width IW, width BW1, and width BW2.

FIGS. 6A-6G illustrate a tread block or tread rib 606 (tread block and tread rib are used herein interchangeably to assist in readability of the application) with a bi-directional interlocking sipe and slot 610. The sipe/slot 610 is formed using sipe blade 530 and thus includes the same dimensions and ratios described with respect to sipe blade 530. Sipe/slot 610 extends radially inwardly into tread block 606 from a tread surface 601. Sipe/slot 610 may include a radially outer widened portion 646, an interlocking portion 648, and a base portion 649. Interlocking portion 648 may be radially inward of and directly connected to outer portion 646. Base portion 649 may be radially inward of and directly connected to interlocking portion 648.

Interlocking portion 648 includes positive and negative interlocking elements formed by a plurality of elements within interlocking portion 648. Interlocking portion 648 may include a radially outermost radial portion 660 connected directly to outer portion 646. Interlocking portion 648 may include a first angled portion 662 angled in a first circumferential direction, oriented radially inwardly of and connected directly to radial portion 660. Interlocking portion 648 may include a second angled portion 664 angled in a second circumferential direction, oriented radially inwardly of and connected directly to first angled portion 662. Interlocking portion 648 may include a third angled portion 666 angled in the first circumferential direction, oriented radially inwardly of and connected directly to second angled portion 664. Base portion 649 is oriented radially inwardly of and connected directly to third angled portion 666. First, second, and third angled portions 662, 664, 666 of interlocking portion 648 may form a zig-zag shape in a plane formed by the radial axis R and the circumferential axis C. Alternatively, first, second, and third angled portions 662, 664, 666 of interlocking portion 648 may form a sinusoidal wave shape in a plane formed by the radial axis R and the circumferential axis C.

Base portion 649 is tapered as described above with respect to base portion 539 of sipe blade 530.

Figure 6A:
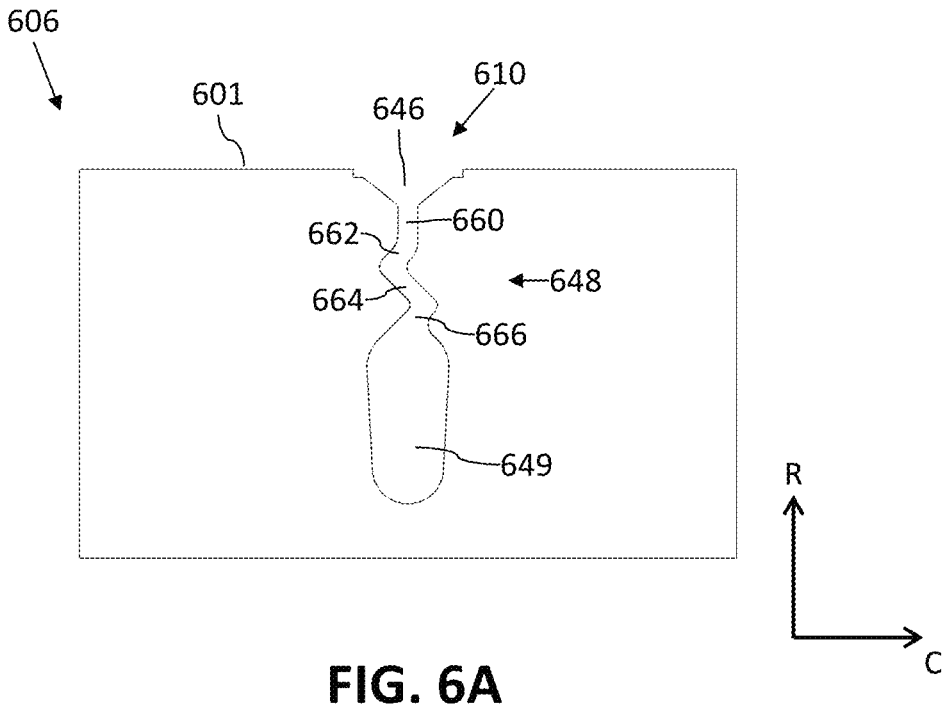
FIG. 6A illustrates an elevation view of a tread block 606 with a bi-directional interlocking sipe and slot 610.
Figure 6B:
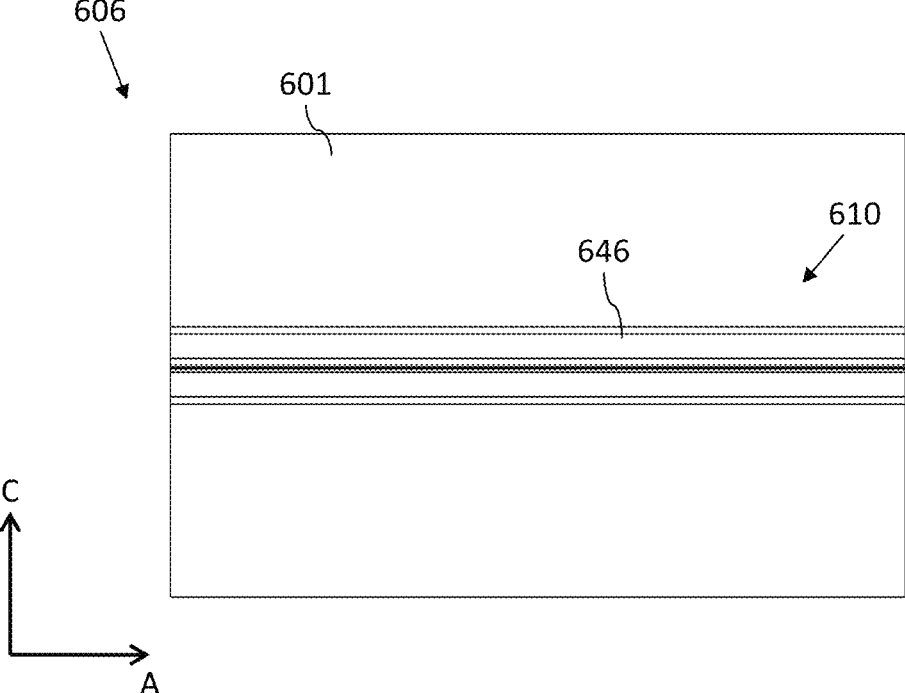
FIG. 6B illustrates a plan view of tread block 606 with bi-directional interlocking sipe and slot 610.
Figure 6C:
FIG. 6C illustrates a perspective view of tread block 606 with a bi-directional interlocking sipe and slot 610.
Figure 6C:
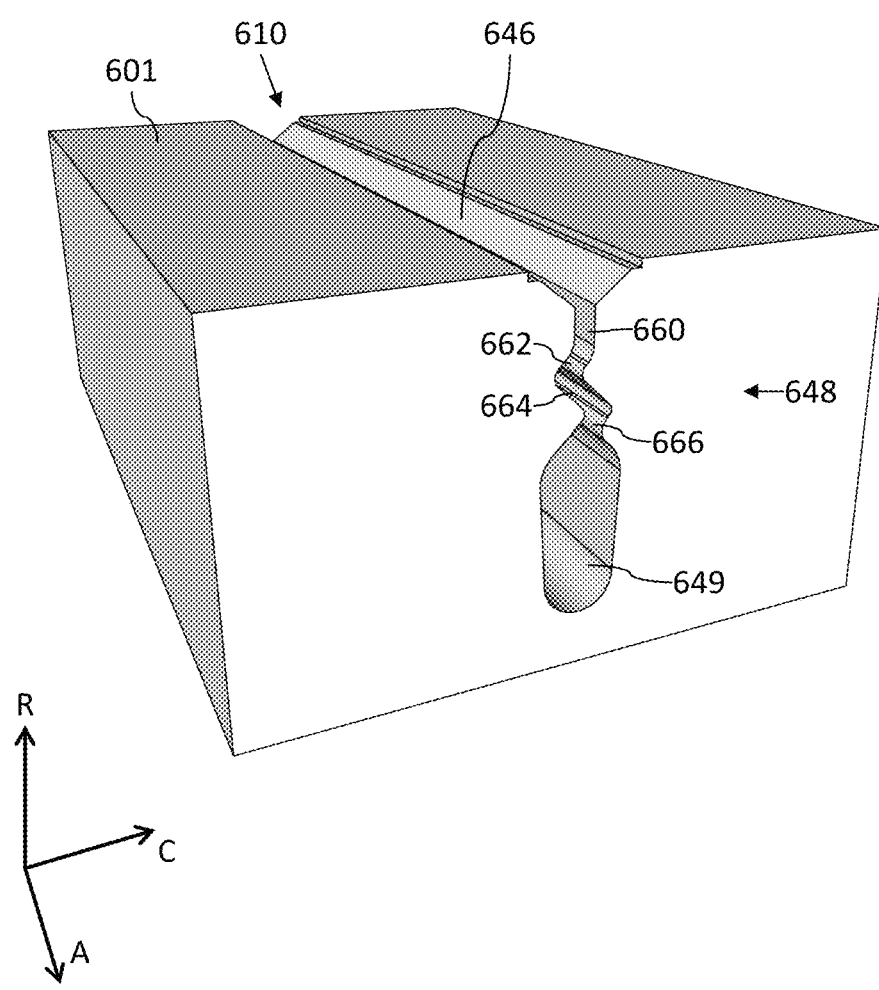
Figure 6D:
FIG. 6D illustrates an exploded perspective view of tread block 606 with a bi-directional interlocking sipe and slot 610.
Figure 6D:
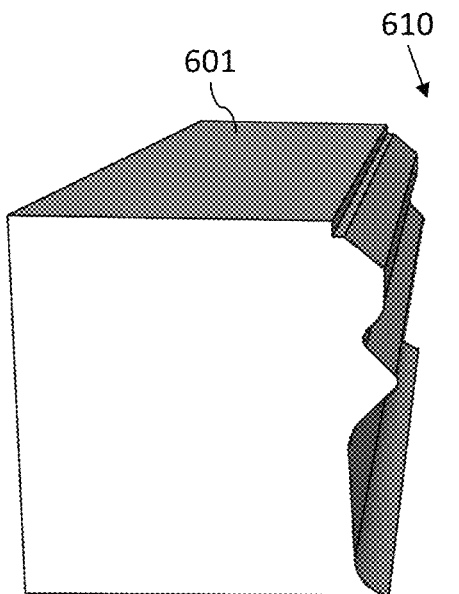
Figure 6D:
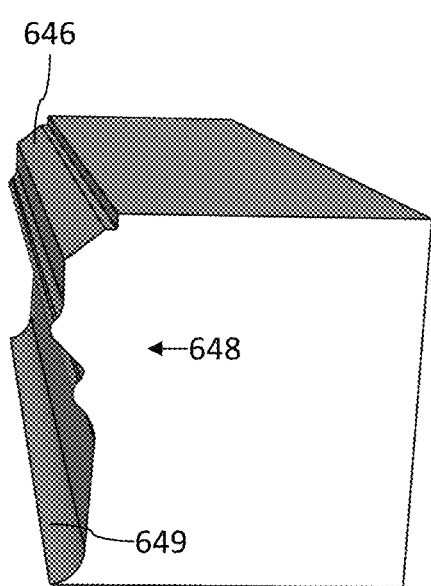
Figure 6D:
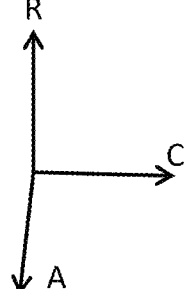
Figure 6G:
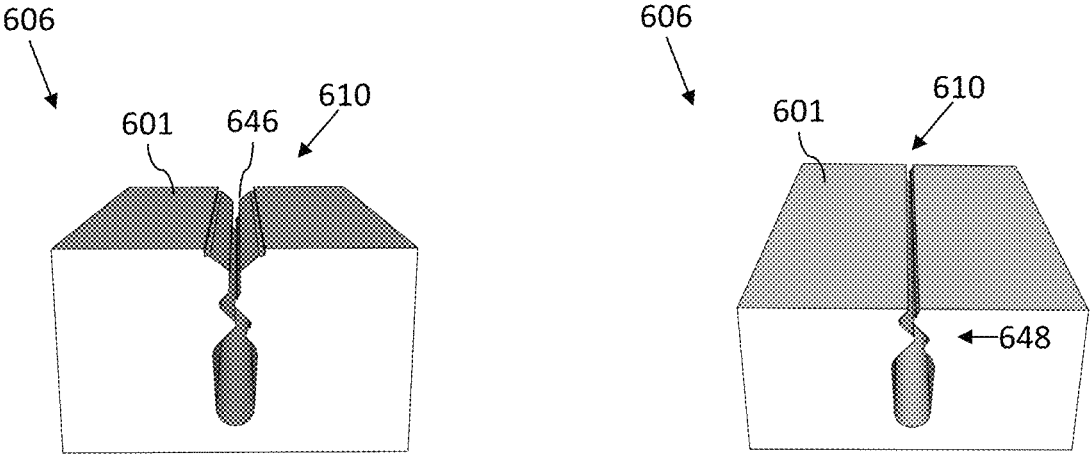
FIG. 6G illustrates a perspective view of a worn tread block 606 with a bi-directional interlocking sipe and slot 610.
Figure 6G:
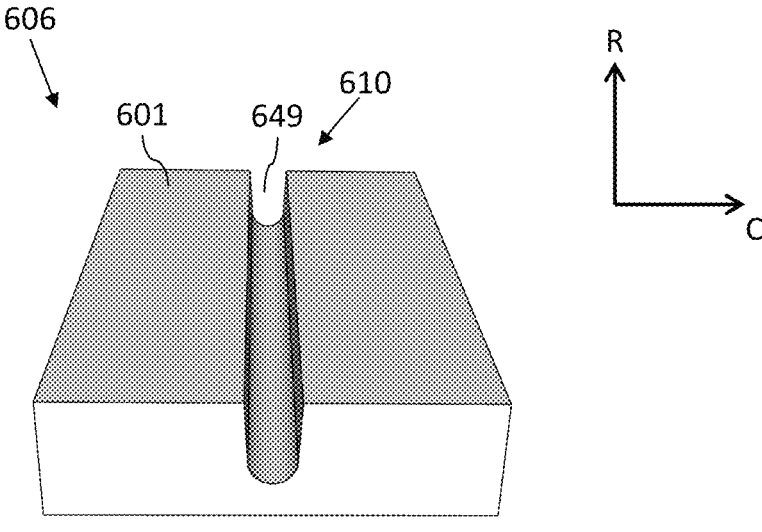

FIGS. 6E-6G show block 606 in various states of wear. FIG. 6E illustrates block 606 in an unworn condition. FIG. 6F illustrates block 606 in a worn condition, wherein outer portion 646 has been worn away such that interlocking portion 648 contacts tread surface 601. FIG. 6G illustrates block 606 in a worn condition, wherein outer portion 646 and interlocking portion 648 have been worn away such that base portion 649 contacts tread surface 601.

As is illustrated in the various wear stages of FIGS. 6E-6G, sipe/slot 610 may act as a slot (wider than a sipe) at outer portion 646 and base portion 649, and an interlocking sipe (thinner than a slot) at interlocking portion 648.

With respect to the various aspects described above, a tire tread having a sipe/slot as described herein may have improved traction in snow and/or ice versus tire tread lacking such a feature. A tire tread having a sipe/slot as described herein may have improved traction in snow and/or ice both during worn and unworn phases of the sipe/slot.

A tire tread having a sipe/slot as described herein may have improved high speed wet performance and water evacuation characteristics both in worn and unworn phases of the sipe/slot due to base portions 249, 449, and 649 acting to evacuate water from the tire tread footprint by providing a passageway for the water during all phases of wear of the sipe/slot in which the base portions remain.

A tire tread having a sipe/slot as described herein may have improved dry stopping characteristics due to interlocking portions 248, 448, and 648. A tire tread having a sipe/slot as described herein may have improved cornering characteristics due to interlocking portions 248, 448, and 648. Interlocking portions 248, 448, and 648 of the sipes/slots described herein create interlocking sipe sidewalls that self-contact (interlock) under braking, acceleration, and lateral maneuvers. This interlocking aspect of the tread block may act to increase block rigidity under braking, acceleration, and/or lateral maneuvers.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available in tire manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments and aspects thereof, and while the embodiments and aspects have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

What is claimed is:

1. A tire comprising:
   a tread portion comprising at least one of a tread rib or a tread block,
   a sipe included in the tread rib or the tread block, the sipe including:
       a radially outer portion,
       an interlocking portion radially inward of and directly connected to the radially outer portion, and
       a base portion radially inward of and directly connected to the interlocking portion,
           wherein the base portion tapers radially inwardly from a width BW1 to a width BW2, wherein width BW1 is greater than width BW2, and wherein the base portion tapers with straight sides between width BW1 and width BW2,
       a centerline CL extending through a circumferential center of the radially outer portion and the base portion, wherein
       the interlocking portion includes a plurality of positive interlocking portions and negative interlocking portions forming a sinusoidal wave profile in a plane formed only in a circumferential axis C of the tire and an axial axis A of the tire, and wherein,
       the radially outer portion and the base portion are circumferentially aligned with one another in a plane formed in the circumferential axis C of the tire and the axial axis A such that the centerline CL is parallel to a radial axis R of the tire.

2. The tire of claim 1, wherein a ratio of the width BW1 and the width BW2 is 1.15.

3. The tire of claim 1, wherein a ratio of the width BW1 and the width BW2 is 1.25.

4. The tire of claim 1, wherein the radially outer portion includes a width TSW, wherein the interlocking portion includes a width IW, and wherein a ratio of the width TSW to the width IW is 4.00.

5. The tire of claim 1, wherein the radially outer portion includes a width TSW, and wherein a ratio of the width TSW to the width BW1 is 1.33.

6. The tire of claim 1, wherein the radially outer portion includes a width TSW, and wherein a ratio of the width TSW to the width BW1 is 2.00.

7. The tire of claim 1, wherein the radially outer portion includes a width TSW, and wherein a ratio of the width TSW to the width BW2 is 1.54.

8. The tire of claim 1, wherein the radially outer portion includes a width TSW, and wherein a ratio of the width TSW to the width BW2 is 2.50.

9. The tire of claim 1, wherein the radially outer portion includes a width TSW, wherein the interlocking portion includes a width IW, and wherein the width TSW is greater than the width IW, the width BW1, and the width BW2.

10. The tire of claim 1, wherein the positive interlocking portions and the negative interlocking portions are out of phase with one another to allow interlocking.

11. The tire of claim 1, wherein the tread portion includes a tread surface, wherein in an unworn state, the radially outer portion contacts the tread surface, and wherein in a worn state, one of the interlocking portion and the base portion contacts the tread surface.

12. A tire comprising:
a tread portion comprising at least one of a tread rib or a tread block,
a sipe included in the tread rib or the tread block, the sipe including:
a radially outer portion,
an interlocking portion radially inward of and directly connected to the radially outer portion, and
a base portion radially inward of and directly connected to the interlocking portion,
wherein the base portion tapers radially inwardly from a width BW1 to a width BW2, wherein width BW1 is greater than width BW2 and wherein the base portion tapers with straight sides between width BW1 and width BW2,
a centerline CL extending through a circumferential center of the radially outer portion and the base portion, wherein the interlocking portion includes a plurality of positive interlocking portions and negative interlocking portions forming a zig-zag shape in a plane formed by a circumferential axis C of the tire and a radial axis R of the tire, and wherein,
the radially outer portion and the base portion are circumferentially aligned with one another in a plane formed in the circumferential axis C of the tire and an axial axis A such that the centerline CL is parallel to the radial axis R of the tire.

13. The tire of claim 12, wherein a ratio of the width BW1 and the width BW2 is 1.15.

14. The tire of claim 12, wherein a ratio of the width BW1 and the width BW2 is 1.25.

15. The tire of claim 12, wherein the radially outer portion includes a width TSW, wherein the interlocking portion includes a width IW, and wherein a ratio of the width TSW to the width IW is 4.00.

16. The tire of claim 12, wherein the radially outer portion includes a width TSW, wherein the interlocking portion includes a width IW, and wherein the width TSW is greater than the width IW, the width BW1, and the width BW2.

17. The tire of claim 12, wherein the tread portion includes a tread surface, wherein in an unworn state, the radially outer portion contacts the tread surface, and wherein in a worn state, one of the interlocking portion and the base portion contacts the tread surface.

18. The tire of claim 12, wherein the interlocking portion includes:
a radially outermost radial portion connected directly to the outer portion,
a first angled portion angled in a first circumferential direction, oriented radially inwardly of and connected directly to the radial portion,
a second angled portion angled in a second circumferential direction, oriented radially inwardly of and connected directly to the first angled portion, and
a third angled portion angled in the first circumferential direction, oriented radially inwardly of and connected directly to the second angled portion.

* * * * *